UNITED STATES PATENT OFFICE 2,353,569

SULPHONAMIDO MONOAZO DYESTUFFS

Oscar Knecht and Theodor Wirth, Basel, Switzerland, assignors to Sandoz Ltd., Fribourg, Switzerland, a firm No Drawing. Application July 13, 1942, Serial No. 450,794. In Switzerland July 11, 1941

4 Claims. (Cl. 260—163)

The present invention relates to a process for the manufacture of new monoazo dyestuffs which dye animal fibres in pure yellow shades of good fastness properties.

It has been found that new valuable yellow acid dyestuffs can be prepared by coupling a diazotized aminobenzene sulphonamide of the formula

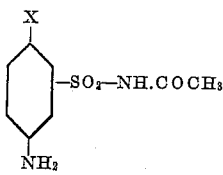

wherein X stands for hydrogen and methyl with arylpyrazolone sulphonic acids.

The aminobenzene sulphonamides of the above formula, in which one hydrogen of the sulphamide group is replaced by an acetyl group and which are used according to the present invention, are intermediate products which have not been used for the manufacture of dyestuffs.

The monoazo dyestuffs obtained from these intermediates dye wool and silk from an acid bath in greenish yellow shades of excellent fastness to light. As compared to the known pyrazolone dyestuffs described in the U. S. A. specification No. 1,876,884 and prepared from such diazotized aminobenzene sulphonamides in which one hydrogen atom of the sulphonamide group is replaced by an aryl nucleus, the new dyestuffs possess better levelling properties and a better stability to alkali.

The following examples, without being limitative, illustrate the present invention, the parts being by weight:

Example 1

214 parts of metanilic acid acetyl amide of M. P. 152° C. which can be prepared, for example, by acetylation of meta-nitrobenzene sulphonamide and subsequent reduction, are diazotized in the usual way. The solution of the diazo compound is then added to an aqueous solution of 323 parts of 1-(2':5'-dichloro-4'-sulphophenyl)-3-methyl-5-pyrazolone containing sodium acetate. When the coupling has completed, the dyestuff is salted out and filtered. In dry state it is a yellow powder dyeing wool from an acid bath in clear greenish-yellow shades. The dyeings possess excellent fastness to light, excellent levelness and very good fastness to alkali.

The formula of the new dyetuff is the following one:

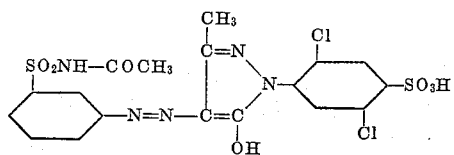

By using instead of the above mentioned pyrazolone an equivalent quantity of 1-(4'-chloro-2'-sulphophenyl)-3-methyl-5-pyrazolone, a dyestuff will be obtained with similar shade and properties.

Example 2

228 parts of 4-amino-1-methylbenzene-2-sulphoacetylamide of M. P. 172° C. obtained by acetylation of 4-nitro-1-methylbenzene-2-sulphonamide and subsequent reduction, are diazotized in the usual manner and coupled in presence of an excess of sodium carbonate with 323 parts of 1-(2':5'-dichloro-4'-sulphophenyl)-3-methyl-5-pyrazolone. The dyestuff thus obtained is isolated in the usual manner and dried. It is a yellow powder dyeing wool from an acid bath in clear greenish-yellow shades, which possess excellent fastness to light, to alkali and levelling.

The formula of the new dyestuff is the following one:

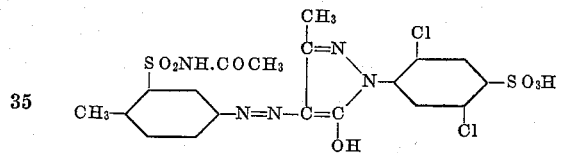

By using instead of the above cited pyrazolone 288.5 parts of 1-(2'-chloro-5'-sulphophenyl)-3-methyl-5-pyrazolone, a dyestuff with similar shade and properties will be obtained.

What we claim is:

1. The monoazo dyestuffs of the general formula

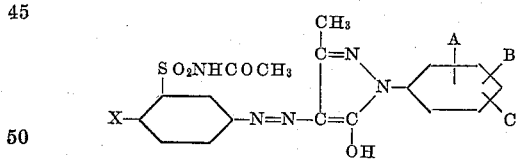

wherein X stands for a member of the group consisting of hydrogen and methyl, A and B each stand for a member of the group consisting of hydrogen and halogen and C stands for a sulphonic acid group, which dyestuffs are yellow powders, dyeing animal fibres in bright yellow shades of excellent fastness properties.

2. The monoazo dyestuff of the formula

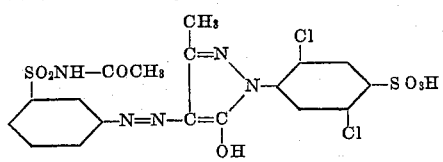

being a yellow powder, dyeing animal fibres in bright yellow shades of excellent fastness properties.

3. The monoazo dyestuff of the formula

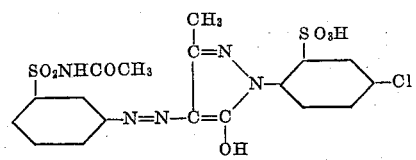

being a yellow powder, dyeing animal fibres in bright yellow shades of excellent fastness properties.

4. The monoazo dyestuff of the formula

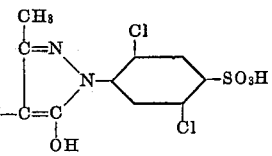

being a yellow powder, dyeing animal fibres in bright yellow shades of excellent fastness properties.

OSCAR KNECHT.
THEODOR WIRTH.